(No Model.)
J. P. YOUNG.
DUMPING CART.
No. 552,949. Patented Jan. 14, 1896.
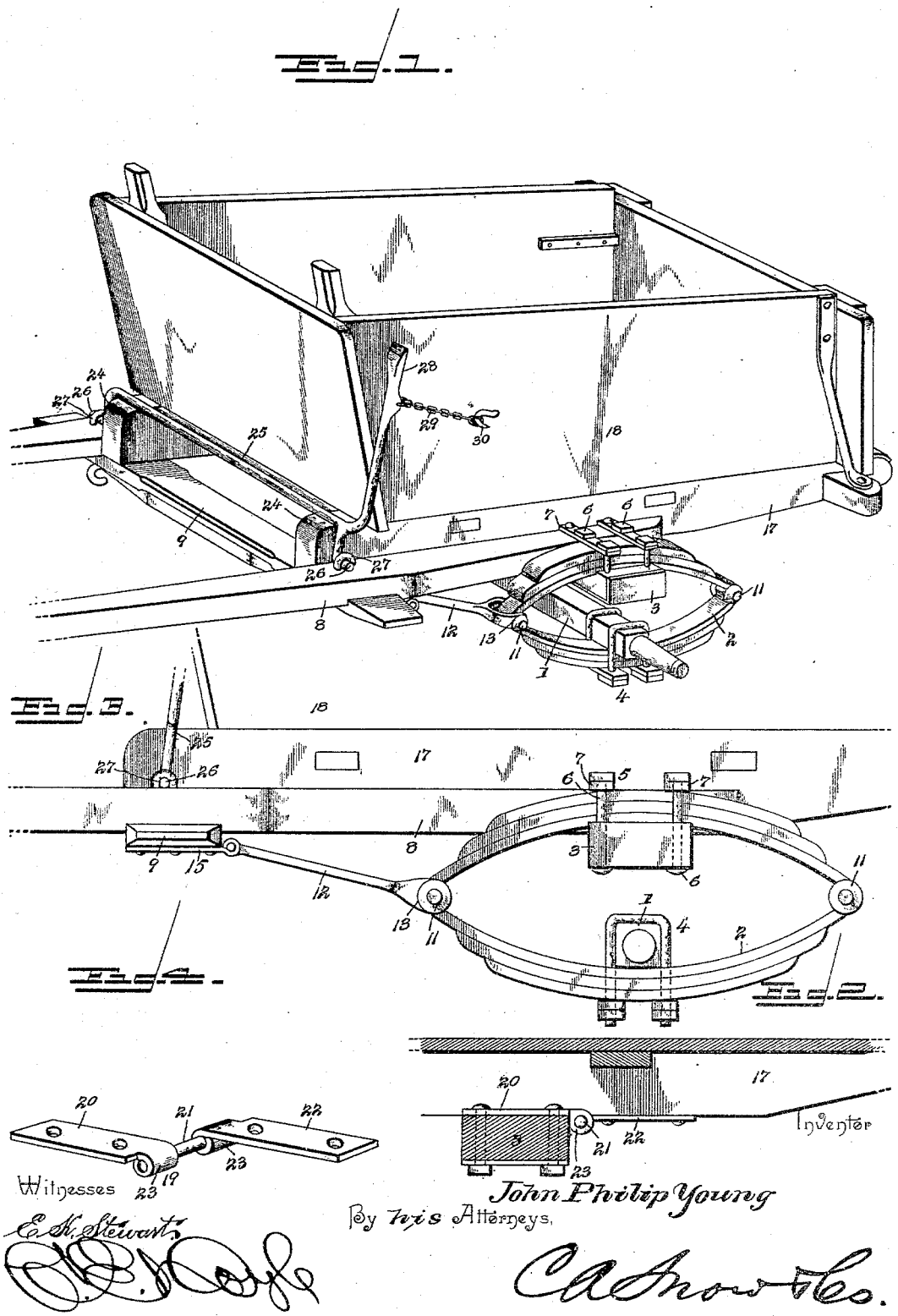
Witnesses
Inventor
John Philip Young
By his Attorneys,

UNITED STATES PATENT OFFICE.

JOHN PHILIP YOUNG, OF LOUISVILLE, KENTUCKY.

DUMPING-CART.

SPECIFICATION forming part of Letters Patent No. 552,949, dated January 14, 1896.

Application filed December 18, 1894. Serial No. 532,229. (No model.)

*To all whom it may concern:*

Be it known that I, JOHN PHILIP YOUNG, a citizen of the United States, residing at Louisville, in the county of Jefferson and State of Kentucky, have invented a new and useful Dumping-Cart, of which the following is a specification.

My invention relates to a dumping-cart, and has for its object to provide a spring-cart so constructed as to have the requisite strength to withstand the rough usage to which a vehicle of this class is subjected; to provide means for communicating the draft of the shafts directly to the springs which form the connection between the bed of the cart and the axle; and furthermore, to provide improved means for mounting and securing the cart in its normal position.

Further objects and advantages of the invention will appear in the following description, and the novel features thereof will be particularly pointed out in the appended claims.

In the drawings, Figure 1 is a perspective view of a cart constructed in accordance with my invention. Fig. 2 is a partial longitudinal section. Fig. 3 is a detail partial side view, to show the spring and connections. Fig. 4 is a detail view of the hinge which is employed to connect the body to the running-gear.

Similar numerals of reference indicate corresponding parts in all the figures of the drawings.

1 designates the axle, to the lower side of which is secured the lower members of the elliptical springs 2, and 3 represents a transverse spring-bar, the upper side of which is arranged in contact with the lower surfaces of the upper members of said springs. The lower members of the springs are secured to the axle by means of clips 4 and the upper members thereof are secured to the spring-bar by means of clips 5, consisting of the bolts 6 and the clip-plates 7. These clips 5 also secure the rear ends of the shafts 8 to the upper side of the spring-bar, said shafts being connected at an intermediate point by the cross-bar 9. The spring which I prefer to employ in this connection is provided with terminal pins 11.

In order to communicate forward draft or strain to the springs, as well as to the spring-bar, in order to avoid the transmission of motion solely from the spring-bar through the spring to the axle, I employ draft-rods 12, connected at their front ends to the shafts (or as in the construction illustrated to the cross-bar connecting the shafts) and at their rear ends to the front terminals of the springs, the latter connection being made by means of the front pins 11, which engage eyes 13 at the bifurcated rear ends of the draft-rods. This forms a pivotal connection between the draft-rods and the front extremities of the springs, whereby when the spring is compressed by a heavy load in the body, or when the body is vibrating vertically by reason of the vehicle traversing an irregular surface, the parts yield and straining of the connections is avoided; also, the draft-rods are jointed, the front sections 15 thereof being secured permanently to the shafts and the rear sections being pivotally connected at their front ends to the rear ends of the fixed sections 15.

The sills 17 of the body 18 are so spaced as to fit between the inner sides of the shafts and rest at their lower edges upon the upper surfaces of the spring-bar and the cross-bar which connects the shafts, and said sills are pivotally connected to the spring-bar by means of hinges 19, having members 20 secured to the spring-bar and provided with pintles 21, and members 22 secured to the sills of the body and provided with eyes or sleeves 23 to receive said pintles.

The front ends of the sills of the body project beyond the front end of the body proper and are rounded as shown at 24, and a locking-bail 25 is mounted at its ends upon the shafts and is adapted to engage said projecting front ends of the sills. This bail is provided at its extremities with extensions or trunnions 26, which fit in eyes or keepers 27, and attached to one end of the bail is a handle 28, provided with a chain 29 for engagement with a hook 30 on the side of the body.

The above-described relative arrangement of the spring-axle and the rear ends of the shafts is designed to secure compactness of construction, in order that the floor of the cart-body may be arranged at a suitable and not an excessive elevation, and hence the attachment of both the axle and the spring-bar to the inner surfaces of the upper and lower sides of the springs. This brings the axle and spring-bar close together without depriving the spring of its resiliency.

It will be understood that in practice various changes in the form, proportion, and the minor details of construction may be resorted to without departing from the spirit or sacrificing any of the advantages of this invention.

Having described my invention, I claim—

1. The combination in a two-wheeled vehicle or cart, of an axle, a parallel superjacent spring-bar, and elliptical side springs connecting the extremities of the spring-bar to the axle, said axle and spring-bar having their extremities arranged within the springs and respectively in contact with the lower and upper sides thereof, shafts secured at their rear ends to the spring-bar, and a body hinged to the spring-bar, substantially as specified.

2. The combination in a two-wheeled vehicle with an axle, of a transverse spring-bar, springs connecting the spring-bar to the axle, shafts secured at their rear ends to the spring-bar, draft-rods connected to the front ends of the springs and attached to the shafts in advance of the spring bar, and a body supported upon and hinged to the spring-bar, substantially as specified.

3. In a two-wheeled vehicle the combination with an axle, of elliptical-springs having their lower sides secured to the under surface of the axle, a spring-bar arranged with its upper surface in contact with the lower surfaces of the upper sides of the spring and secured thereto, shafts secured to the upper surface of the spring-bar and connected in advance of the spring-bar by a cross-bar, jointed draft-rods having their front sections secured to the cross-bar and their rear ends pivotally connected to the front ends of the springs and a body hinged to the spring-bar, substantially as specified.

In testimony that I claim the foregoing as my own I have hereto affixed my signature in the presence of two witnesses.

JOHN PHILIP YOUNG.

Witnesses:
  GUS MILLER,
  HENRY SCHANZENBACHER.